Dec. 27, 1949            E. L. HARLEY            2,492,798
ROTATABLE MIRROR MEANS FOR REGISTERING FLAT
BED COLOR PRINTING ELEMENTS WITH THEIR
CORRESPONDING FIXED REGISTRY ELEMENTS
Filed Oct. 29, 1946            2 Sheets—Sheet 2
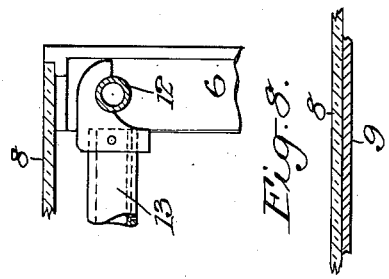
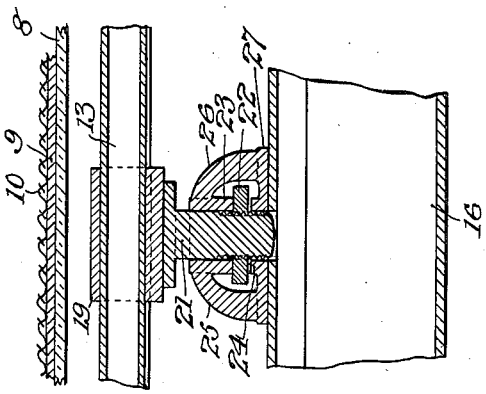
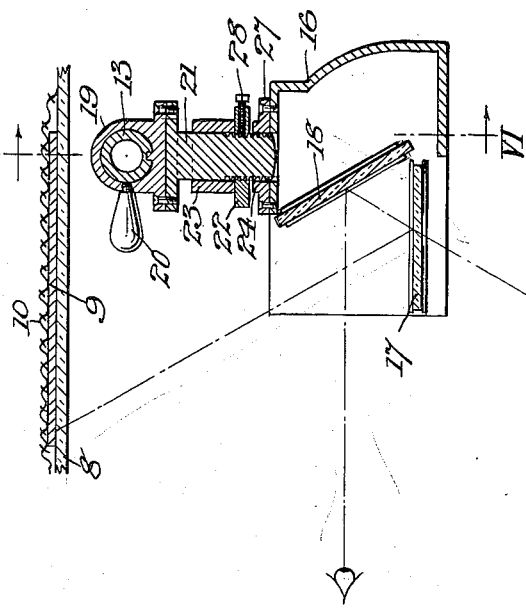
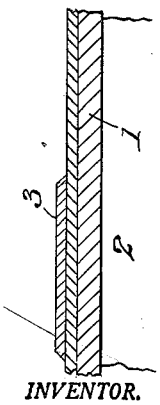
INVENTOR.
Earle L. Harley
BY
Attorneys Patented Dec. 27, 1949

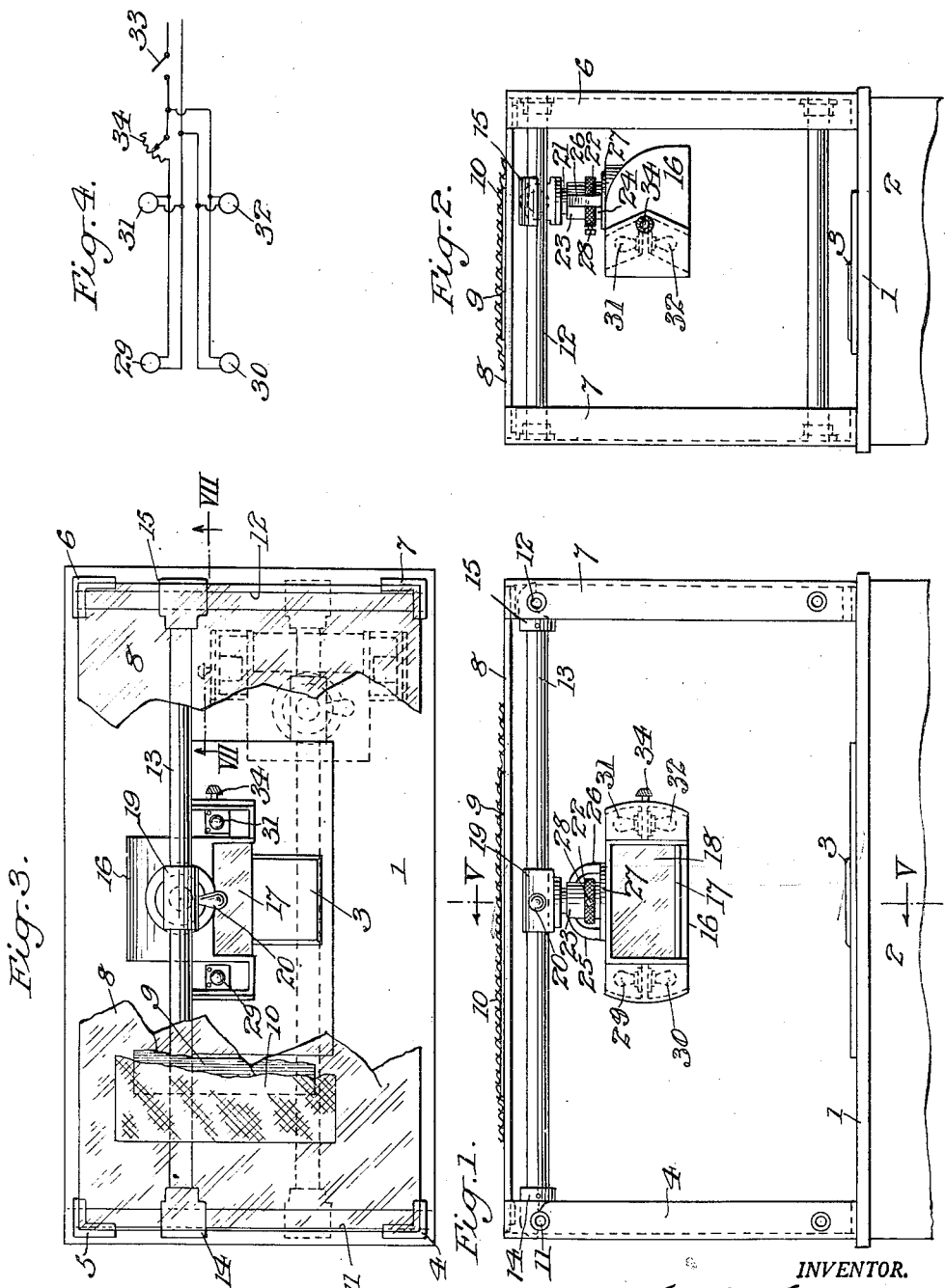

2,492,798

UNITED STATES PATENT OFFICE 2,492,798

ROTATABLE MIRROR MEANS FOR REGISTERING FLAT-BED COLOR PRINTING ELEMENTS WITH THEIR CORRESPONDING FIXED REGISTRY ELEMENTS

Earle L. Harley, Brooklyn, N. Y.

Application October 29, 1946, Serial No. 706,418

3 Claims. (Cl. 88—14)

My invention is directed to a novel method of and means for registering a flat bed color printing element with a fixed registry element of any type and particularly to the registering of each of a plurality of flat bed color printing forms with its corresponding registry proof or design so as to ensure accurate color registry in the subsequent printing from said printing forms.

My invention includes the use of a novel type of mirror unit which comprises a transparent mirror and a coacting non-transparent mirror disposed at an angle thereto; the mirror unit being located in position to cause the non-transparent mirror to receive combined images of corresponding surfaces reflected from the registry element by the transparent mirror and directly from the printing element through said transparent mirror and to reflect said combined images to the eye of an observer.

My invention also includes the registering of the combined images on the non-transparent mirror by the movement of the printing element.

My invention also includes the movability of the mirror unit to cause its non-transparent mirror to present superimposed images of different corresponding surfaces of the printing and registry elements.

My invention also includes the rotative adjustment of the mirror unit for causing its non-transparent mirror to reflect combined images of different corresponding surfaces in different directions.

My invention also includes certain novel features in the machine for producing the results set forth.

The machine is represented in the accompanying drawings, in which

Fig. 1 represents a front elevation of the machine;

Fig. 2 represents an end elevation;

Fig. 3 represents a top plan with the registry element and its support broken away; the mirror unit, its carrying member and the longitudinally disposed laterally adjustable bar being all shown in dotted lines in other positions;

Fig. 4 represents a diagrammatic layout of the lighting system;

Fig. 5 represents a detail vertical section on an enlarged scale, taken in the plane of the line V—V of Fig. 1;

Fig. 6 represents a detail vertical section, taken in the plane of the line VI—VI of Fig. 5;

Fig. 7 represents a vertical section on an enlarged scale, taken in the plane of the line VII—VII of Fig. 3; and Fig. 8 represents a detail section on an enlarged scale, showing the registry element secured to the underside of its support.

The machine may be constructed, arranged and operated as follows.

The horizontal imposing table 1 surmounts a suitable base 2 for bringing the table up to the desired height for convenient use. This table forms a suitable support for the color printing plate 3, which plate is movable to different positions thereon for registry purposes, as will be hereinafter explained. A frame uprises from the table 1, which frame is shown as provided with four corner uprights 4, 5, 6 and 7 suitably secured at their bases to the said table.

A plate of glass or other rigid transparent material 8 is arranged parallel to the table 1 at the desired position over the table and it is shown as mounted at its corners in the upper ends of the said uprights 4, 5, 6 and 7, thus forming a support for the fixed registry element 9 which may be, for instance, a make-up detail or a proof sheet.

A suitable cover 10, as, for instance, a canvas sheet may be placed over the fixed registry element 9 to hold it flat on the plate 8 in its proper position over the printing element 3.

This frame is also provided with two fixed parallel crossbars 11 and 12 extending between the uprights 4, 5 and 6, 7 respectively. A longitudinally disposed bar 13 acts as a hanging support for the mirror unit to be immediately described, which bar is provided at its ends with hook members 14 and 15 slidably mounted on the crossbars 11 and 12 respectively.

A mirror unit is suspended from the laterally adjustable bar 13 between the printing and registry elements and it is shown as comprising a housing 16 in which there are located a horizontally disposed transparent mirror 17 and its coacting angularly disposed non-transparent mirror 18. The front and a portion of the bottom of this housing 16 are open to permit the unobstructed reflection of the images of corresponding surfaces of the printing and registry elements and also the unobstructed view of the non-transparent mirror by the eye of the observer.

The means for suspending the mirror unit from the bar 13 is as follows: A sleeve 19 has a tongue and groove sliding engagement with the bar 13, a handle 20 being provided for moving the sleeve 19 to its various adjustments along the bar. This sleeve 19 is provided with a depending screw threaded pin 21 which carries an adjusting nut 22 for use in vertically adjusting the position of the mirror unit to bring its horizontal mirror 17 midway between the printing and registry elements.

The housing 16 of the mirror unit is surmounted by hubs 23 and 24 which surround and are rotatable on the depending pin 21 above and below the adjusting nut 22. The upper hub 23 is connected across the nut 22 by arms 25 and 26 to the plate 27 which forms a part of the lower hub 24 so that the weight of the mirror unit is borne by the nut 22 through its contact with the upper hub 23. A set screw 28 serves to fasten the nut 22 in its different vertical adjustments along the threaded depending pin 21.

An electric lighting system may be provided for by locating upper and lower lamps 29, 30 and 31, 32 within the housing 16 within open ended channels for directing the light to the registry and printing elements respectively without exposing the lamps to the eye of an observer. Any well known and approved circuit as that illustrated in Fig. 4 which includes a hand switch 33 and a rheostat 34 may be used for controlling the lighting system.

The registry element 9 is placed in the proper position either on the upper side of the supporting plate 8 with the cover 10 to hold the element in position, as shown in Fig. 1, or the registry element may be secured as by the use of an adhesive to the under surface of the plate, as shown in Fig. 8. The printing element 3 is placed on the imposing table 1 in approximate register with the registry element 9. The bar 13 may then be moved across its crossbars 11 and 12 and the sleeve 19 may be moved along the bar 13 to bring the non-transparents mirror 18 into position to receive by reflection from the transparent mirror 17 and directly from the printing element 3, through the transparent mirror 17, combined images of corresponding surfaces of the said elements to be reflected by the non-transparent mirror 18 to the eye of an observer. The printing element may then be moved slightly in any desired direction to bring the image of the printing element into register with the reflected image of the registry element on the non-transparent mirror 18. The mirror unit may be moved to cause the non-transparent mirror 18 to reflect different combined images to the eye of the observer. The mirror unit may also be rotatively adjusted into different positions to cause the non-transparent mirror to reflect combined images of corresponding surfaces of the printing and registry elements in different directions. The mirror unit may also be adjusted vertically to bring the horizontal transparent mirror 17 midway between the printing and registry elements.

It is evident that various changes may be made in the construction, form and arrangement of the several elements of the machine shown and described herein without departing from the spirit and scope of my invention.

What I claim is:

1. In a machine for registering a flat bed color printing element with a fixed registry element, a horizontal support for the printing element to be registered, a horizontal support for the registry element located in a plane above the support for the printing element, a mirror unit comprising a transparent mirror and a non-transparent mirror disposed at an angle thereto in position to receive, by reflection, from the transparent mirror and directly from the printing element through the transparent mirror, combined images of corresponding surfaces of said elements and to reflect the same to the eye of an observer, the printing element being movable parallel to the registry element to bring the image of the printing element into register with the reflected image of the registry element on the non-transparent mirror, and a horizontal support for the mirror unit located between the supports for the printing and registry elements and comprising two parallel crossbars, a longitudinally disposed bar slidable laterally thereon, and a unit carrying member slidable along the longitudinally disposed bar and having a depending pivot pin and a nut threaded thereon, said mirror unit being rotatably mounted on said pivot pin and vertically adjustable by said nut.

2. In a machine for registering a flat bed color printing element with a fixed registry element, a horizontal support for the printing element to be registered, a horizontal support for the registry element located in a plane above the support for the registry element, a mirror unit, a horizontal support therefor located between the supports for the printing and registry elements, said mirror unit comprising a transparent mirror and a non-transparent mirror disposed at an angle thereto in position to receive, by reflection, from the transparent mirror and directly from the printing element through the transparent mirror, combined images of corresponding surfaces of said elements and to reflect the same to the eye of an observer, the printing element being movable parallel to the registry element to bring the image of the printing element into register with the reflected image of the registry element on the non-transparent mirror, and means for rotatively adjusting the mirror unit whereby its non-transparent mirror may be caused to reflect combined images of corresponding surfaces of the printing and registry elements in different directions.

3. In a machine for registering a flat bed color printing element with a fixed registry element, a horizontal support for the printing element to be registered, a horizontal support for the registry element located in a plane above the support for the registry element, a mirror unit, a horizontal support therefor located between the supports for the printing and registry elements, said mirror unit comprising a transparent mirror and a non-transparent mirror disposed at an angle thereto in position to receive, by reflection, from the transparent mirror and directly from the printing element through the transparent mirror, combined images of corresponding surfaces of said elements and to reflect the same to the eye of an observer, the printing element being movable parallel to the registry element to bring the image of the printing element into register with the reflected image of the registry element on the non-transparent mirror, and means for moving the mirror unit parallel to the printing unit and registry units to cause the non-transparent mirror to reflect different combined images to the eye of an observer, and means for rotatively adjusting the mirror unit whereby its non-transparent mirror may be caused to reflect combined images of corresponding surfaces of the printing and registry elements in different directions.

EARLE L. HARLEY.

REFERENCES CITED

The following references are of record in the file of this patent:

UNITED STATES PATENTS

| Number | Name | Date |
| --- | --- | --- |
| 706,297 | De Bruyn | Aug. 5, 1902 |
| 2,289,557 | Taylor | July 14, 1942 |